(12) United States Patent
Klarlund et al.

(10) Patent No.: US 7,129,932 B1
(45) Date of Patent: Oct. 31, 2006

(54) KEYBOARD FOR INTERACTING ON SMALL DEVICES

(75) Inventors: Nils Klarlund, Chatham, NJ (US); Michael Dennis Riley, New York, NY (US)

(73) Assignee: AT&T Corp., New York, NY (US)

( * ) Notice: Subject to any disclaimer, the term of this patent is extended or adjusted under 35 U.S.C. 154(b) by 390 days.

(21) Appl. No.: 10/397,902

(22) Filed: Mar. 26, 2003

(51) Int. Cl.
*G09G 3/02* (2006.01)

(52) U.S. Cl. ............. 345/168; 345/156; 345/169; 345/172; 345/864; 341/22; 341/23; 382/309; 400/485; 704/251

(58) Field of Classification Search ............ 345/168, 345/169, 864, 156, 172; 341/22, 23, 24, 341/67; 382/309, 310; 400/63, 74, 485; 704/240, 251
See application file for complete search history.

(56) References Cited

U.S. PATENT DOCUMENTS

| | | | |
|---|---|---|---|
| 4,843,385 A * | 6/1989 | Borras .................... 340/5.33 |
| 5,288,158 A | 2/1994 | Matias | |
| 5,661,476 A * | 8/1997 | Wang et al. ................ 341/22 |
| 5,828,991 A | 10/1998 | Skiena et al. | |
| 6,295,052 B1 * | 9/2001 | Kato et al. ................ 345/179 |
| 6,307,549 B1 * | 10/2001 | King et al. ............... 715/810 |
| 6,799,303 B1 * | 9/2004 | Blumberg ................. 715/534 |
| 6,801,190 B1 * | 10/2004 | Robinson et al. .......... 345/173 |
| 6,885,317 B1 * | 4/2005 | Gutowitz .................... 341/22 |
| 2001/0048378 A1 * | 12/2001 | Horie ........................ 341/22 |
| 2002/0110237 A1 * | 8/2002 | Krishnan ................... 379/419 |
| 2004/0056844 A1 * | 3/2004 | Gutowitz et al. .......... 345/168 |
| 2004/0140956 A1 * | 7/2004 | Kushler et al. ............ 345/168 |

OTHER PUBLICATIONS

Mikel L, Forcada, 2001. "Corpus-based stochastic finite-state predictive text entry for reduced keyboards: application to Catalan." In procesamiento del Lenguage Natural, XVII Congreso de la Sociedad Espaniola de Procesamiento del Lenguaje Natural, vol. 27, pp. 65-70.

Mikael Goldstein, Robert Book, Gunilla Alsiö, Silvia Tessa. 1999. "Non-Keyboard Qwerty Touch Typing: A Portable Input Interface For The Mobile User". In CHI '99 May 15-20, 1999, pp. 32-39. ACM Press.

Mark D. Dunlop and Andrew Crossan. 2000. "Predictive Text Entry Methods for Mobile Phones." Personal Technologies (2000), 4(2), pp. 134-143.

* cited by examiner

*Primary Examiner*—Bipin Shalwala
*Assistant Examiner*—Vincent E. Kovalick (57) ABSTRACT

A QWERTY-based cluster keyboard is disclosed. In the preferred embodiment, the keyboard comprises fourteen alphabet keys arranged such that all the letters in the alphabet are distributed in three rows of keys and in the standard QWERTY positions. Stochastic language models are used to reduce the error rate for typing on the keyboards. The language models consist of probability estimates of occurrences of n-grams (sequences of n consecutive words), wherein n is preferably 1, 2 or 3. A delay parameter d, which is related to the period of time the system displays the predicted intended word upon entry of a word boundary, is preferably zero to immediately display the primary word choice at a word boundary and provide the user the option to select the secondary candidate if necessary. Two disambiguation keys enable the user to identify which letter is intended as a secondary option to the language model predictions.

6 Claims, 8 Drawing Sheets

KEYBOARD FOR INTERACTING ON SMALL DEVICES

BACKGROUND OF THE INVENTION

1. Field of the Invention

The present invention relates to device keyboards and more specifically to a QWERTY-based keyboard for interacting with electronic devices.

2. Introduction

Developers continue to reduce the size of electronic devices such as personal digital assistants ("PDAs"), wireless phones and other devices. A singular challenge related to user interaction with small devices is how to reduce the number of keys or buttons on the device and still maintain an adequate degree of functionality. The present invention provides a useful reduced keyboard layout and may be applied to any sized device but is especially useful for smaller devices.

SUMMARY OF THE INVENTION

The preferred embodiment of the invention is an interface for enabling a user to communicate with a device. The interface comprises a control module for receiving and processing user key input and in one aspect of the invention comprises fourteen cluster keys communicating with the control module, each cluster key representing at least one letter of the alphabet such that all the alphabet letters are represented. The fourteen cluster keys are arranged such that all the letters in the alphabet are in a QWERTY position or substantially in positions corresponding to standard keyboard positions. Further, the invention may comprise at least one disambiguation key communicating with the control module where the user may depress one of the fourteen keys and a disambiguation key to identify which letter of the alphabet is intended.

Other embodiments of the invention include a method of enabling a user to interact with a device via a keyboard and an interface and a method of interacting with a device wherein the user can mend words being typed. Other embodiments further comprise a QWERTY-based cluster keyboard having up to seven cluster keys or between eight and twenty-six cluster keys wherein the alphabet letters associated with the cluster keys are arranged in a QWERTY layout.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present invention addresses needs in the art. The invention relates to an interface having a reduced number of alphabet keys (less than twenty-six alphabet keys) or cluster keys where each cluster key has at least one associated alphabet letter. The preferred embodiments of the invention comprise fourteen cluster keys and five duster keys. One of many benefits of the present invention is that the fourteen-key keyboard layout, where the position of the letters of the alphabet is in a QWERTY position, is instantly recognizable to the user and reduces the hunt-and-peck challenge of the T9 keyboard layout. A cluster keyboard like that disclosed herein partitions the letters of the alphabet onto subset keys.

On such keyboards most words are typed with no more key presses than on the standard keyboard, but a key sequence may stand for two or more words. For example, on the T9 keyboard the key sequence "66" may denote the words "no" or "on" since the key "6" designates the cluster {"M", "N", "O"}. This ambiguity problem is addressed by hypothesizing words according to their uni-gram (occurrence) frequency. So, if it has been determined that "no" is more frequent than "on", then the system always proposes "no." When the hypothesized word is not the intended one, such as would be the case in the example if "on" was desired, an error arises. Various approaches to manually and automatically dealing with this error are discussed below.

Disclosed herein are systems that deploy large, n-gram language models used in speech recognition for improving the error rate. Experiments on the system use the North American Business News (NAB) corpus, which contains hundreds of millions of words. Without the use of the disambiguation keys, a word-prediction algorithm predicts the appropriate letter.

Figure 1:
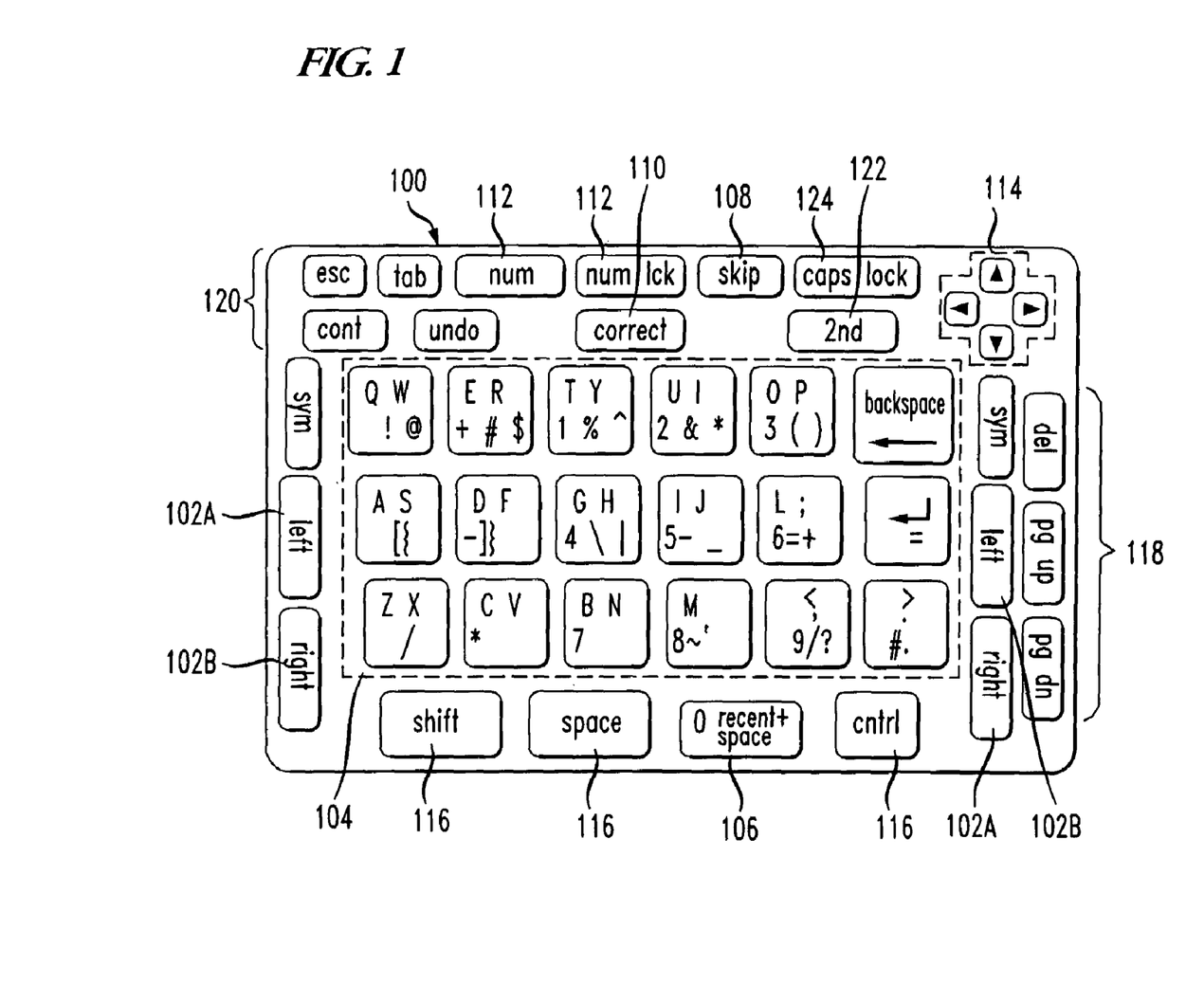
FIG. 1 illustrates a keyboard layout according to an embodiment of the invention.

FIG. 1 provides an illustration of the preferred "Q14" keyboard layout 100. The fourteen alphabet keys 104 each represent at least one letter. The first (top) row contains five keys representing, respectively the letters {Q, W}, {E, R}, {T, Y}, {U, I}, and {O, P}. The second (middle) row of alphabet keys represents, respectively, the letters {A, S}, {D, F}, {G, H}, {J, K} and {L}. The third (bottom) row contains four keys and represents the letters {Z, X}, {C, V}, {B, N} and {M}. Note that the grouping of the letters is in the QWERTY layout and will thus immediately be familiar to most users. The layout shown relates to a standard English keyboard layout. Most keys, except {L} and {M}, are ambiguous because the system will not automatically know which letter is intended. Other keys that may be associated with the keyboard 100 comprise left key 102A and right key 102B that can be termed "disambiguation" keys because they are used to identify the selected letter. For example, if the user presses the {Q, W} key with the left key 102A, it means that the user intends "Q" as the letter. If the user depressed the {Q, W} key with the right key 102B, then the user means to type "W". In this way, initial and single letters can be entered using only the three strongest fingers by pressing two keys at once. Thus, the keyboard does not rely on chording dexterity that not all humans posses. Further, in the preferred embodiment of the invention, a control module within the device utilizes n-grams, for n>1, in order to disambiguate input that is not fully disambiguated with "left" and "right" keys 102A, 102B. If just one letter key in a word is not explicitly disambiguated, then the device uses n-grams to guess the just-typed word.

For example, assume the user desires to type the letter "q". The user presses the key marked {Q, W}, which can produce either "q" or "w". The user presses the key corresponding to the letter only once. The key corresponding to the spacebar defines word boundaries (of course other keys may define word boundaries); and when the spacebar key is pressed, the system consults a dictionary to find the word corresponding to the sequence of cluster keys. Computer algorithms are programmed to perform the operation of disambiguating the probable word or words intended by the user. If there are such several words, called homographs of the cluster layout, then the most likely one is suggested according to its occurrence frequency as calculated over some corpus or as disclosed according to an n-gram model. If the suggestion is wrong, then the user may have the option of explicitly choosing a word from a list of alternatives. The lowest error rates in word selection will be discussed below with respect to the system presenting the top two most likely predicted words.

If the correct word is not among the alternatives, the user may enter the word using an alternative method. For example, the multi-tap method requires that the cluster key be pressed repeatedly until the correct letter appears. To assist in this approach, heuristics such as those based on character n-grams may be employed to hypothesize words that are not in the vocabulary.

In this manner, the user can easily identify the location of desired keys because of the familiar QWERTY layout and easily disambiguate what letter is meant. Other keys that are standard on many keyboards include escape, tab, continue, and undo keys 120, num and num lock keys 112, a correct key 110, a skip key 108, a $2^{nd}$ key 122, caps lock 124, arrow keys 114, del, page-up and page-down keys 118, shift, space and control keys 316, and a recent + space key 106. The $2^{nd}$ key 122 reduces the cognitive load on the user by providing a one-press correction of a wrongly guessed word. For example, as the user arrives at a word boundary such as a space, with a delay value of zero where the system immediately displays the predicted primary word, the secondary candidate is displayed as suggested by the stochastic language models and the user can press the $2^{nd}$ key 122 to replace the primary candidate with the secondary candidate. Other keys are available as well. The particular layout and placement of these ancillary keys to the main alphabet keys are variable according to the present invention. The main concept of the preferred embodiment of the invention relates to the general positioning of the fourteen (or other number of) alphabet keys.

The skip key 108 provides another aspect of the invention wherein the user can mend typing as it is being typed. Using this key simplifies a typical way of predicting text entry wherein a user is presented with several potential words that the currently typed prefix may be completed to. Typically, the selection of the alternative is obtained through the use of a key, here called the $2^{nd}$ key (such as key 122) to select the next alternative. However, the availability of the skip key 108 addresses deficiencies in the method of presenting several potential word completions because it has been observed that viewing lists of alternatives and selecting from those lists can be inefficient. The proposed solution seeks to enable the user to reduce his cognitive processing load and to only type a few characters of the desired word. It is known that the cognitive load of perusing a list of alternatives is greater than hitting a few keys. The information is provided to the system in an efficient manner wherein new estimates of the intended word can be made that are much more accurate. This process may be termed "mending" since it allows the piecemeal issuance of user commands to improve the system's guesses of the intended word. The skip key allows the user to specify that a word ends with a given letter or that it starts with some letters and ends in others—all without requiring the user to type the whole word.

An example of mending can be wherein a user desires to type the word "completed". The word contains nine letters and it is the objective of the user to type it using substantially fewer keys. As the word is being typed, a lattice is computed after each letter has been entered. From an n-gram database, the most probable words that start with the current prefix of letters are computed. If the two most likely such candidates are "completed" or "complexes", then user should need only to provide the information whether the last letter is "d" or "s". Skipping to the last character "d", the user should be able to update the list of hypothesized words.

In the example above, the user may type "co . . . " after which the words "completed" and "complexes" are shown. After pressing the skip key 108 and then typing "d", the intended word "completed" is now the most likely one, rather than the incorrect word "complexes."

In the preferred embodiment having fourteen keys, the alphabet part of the keyboard is only five alphabetic keys wide, enabling an embodiment in a personal digital assistant (PDA) form factor with keys that are almost full-size. Other embodiments include soft keyboards on small devices such as wireless telephones. Additionally, there is a need for only two disambiguating keys for the rare cases when built-in algorithms will not correctly identify the intended words as a function of the sequence of ambiguous keys depressed. In a preferred embodiment, a set of these two keys—called "left" 102A and "right" 102B—is present on both sides of the letter part of the keyboard.

Also, in one aspect of the preferred embodiment, each key press is shown on the display in a special font that consists of twenty-six characters. In other languages besides English, the special font may comprise more or less characters to accommodate the language. Each character displayed upon a key press consists of the two letters assigned to a cluster key. In cases where the letters assigned to a cluster key are more than two, several solutions are available, such as presenting the top two most likely letters intended by the user, with the most likely letter displayed more prominently. In the preferred embodiment where each cluster key has two letters associated with it, the design of the character presents the most likely letter of the two more prominently. For example, when the user depresses the cluster key for {Q, W}, the letter "Q" is displayed as the character $Q_W$ or the character $W_Q$. During text entry the character chosen for a letter is the one that corresponds to the most likely word hypothesized by the system. For example, after the user has typed on cluster keys {C, V}, {O, P}, the display at the place where the text is entered would be $C_V O_P$. Subsequently, if the user presses {T, Y}, the display of the entered keys will change to $V_C O_P Y_T$ since "voy" is a prefix of "voyage", the most likely completion of the three keys now entered. Thus, previously displayed characters are dynamically changed on a character-by-character basis such that as more cluster keys are pressed by the user, each character's most likely letter is always displayed more prominently.

In another aspect of the present invention, the user can have a level of control over the character displayed upon pressing a cluster key. One manner of providing user control is a toggle or correction key that fixates the meaning of the current ambiguous letter, say $Q_W$, to that of the second choice, in this case "W". By pressing the toggle key twice, the letter would be fixed to the primary candidate, so $Q_W$ becomes "Q". Correct key 110 shown in FIG. 1 may represent such a correction key as described above.

With the features disclosed herein, the present invention presents an advantage over T9: it is possible to verify each key entered. With up to four letters on T9, a similar method would result in a confusing display.

Figure 2:
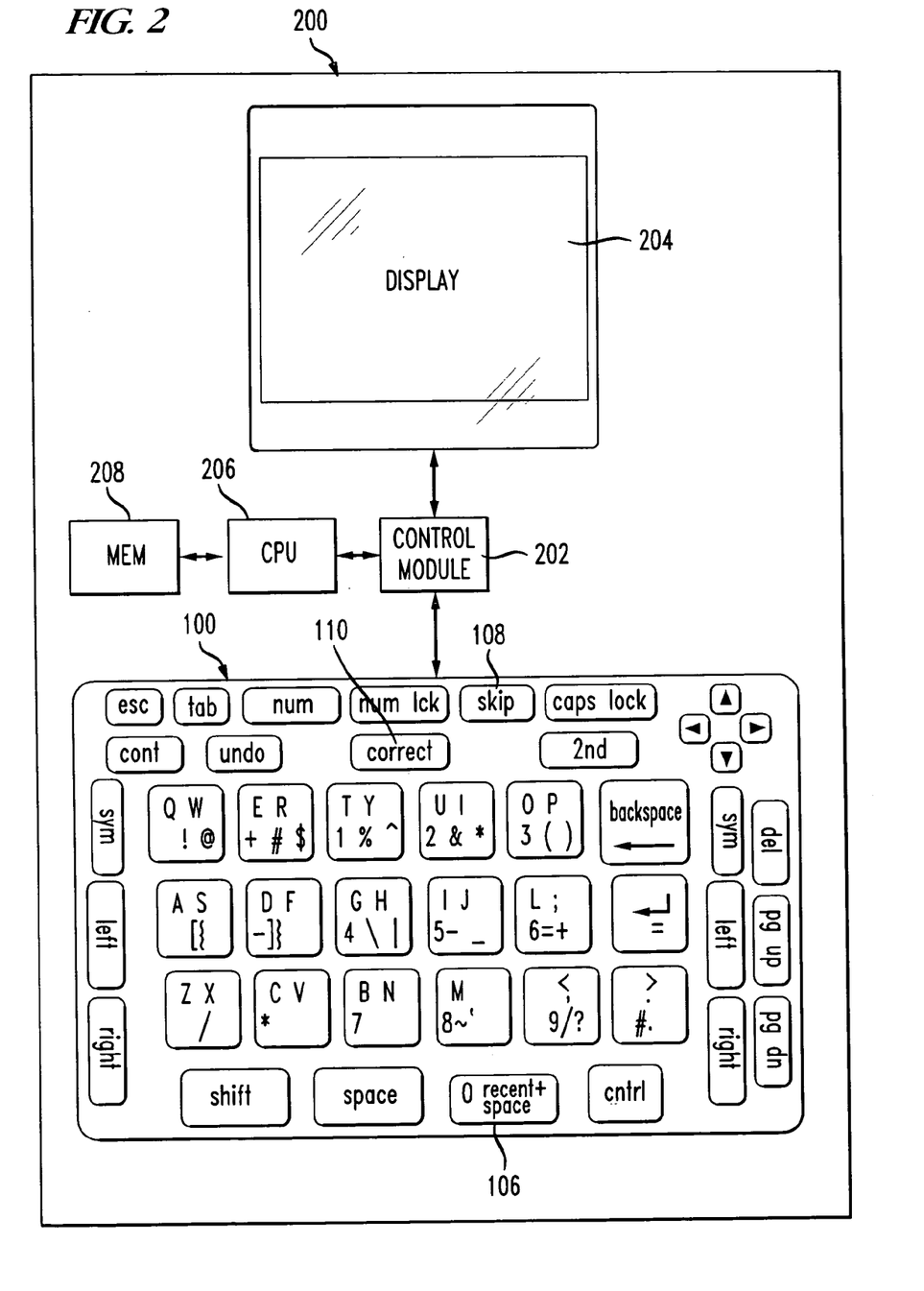
FIG. 2 illustrates the control module communicating with the keyboard within a device.

FIG. 2 illustrates an exemplary device 200 having a keyboard 100 communicating with a control module 202 and a display 204. Other standard components within the device 200 include a central processing unit 206 and device memory 208. Several keys such as the correct key 110, skip key 108 and recent +space key 106 are highlighted. FIG. 2 provides a general disclosure of the interaction of the keyboard with device hardware. The present invention is independent of device and operating system. A general or specific device may be used in connection with the present invention. The particular operating system or hardware system is not critical or necessarily relevant to the main concepts of the invention. As a general statement, the present invention will most likely be applied in handheld electronic devices running operating systems like Microsoft Windows CE, or the Palm operating system. It is assumed that one of skill in the art will understand the interaction programming requirements to integrate the keyboard layout and interpretive algorithms disclosed herein with any particular device hardware.

Other minor variations to the alphabet keys 104 may exist. The number of keys in each row and the number of rows may be modified without departing from the scope of the invention. More disambiguation keys may be used as well (for example, if some of the keys have three letters associated with them), but such an arrangement is not preferable, at least not for the twenty-six letter English alphabet.

The present invention uses n-gram information on a partially completed sentence for automatic error correction. In this way, the last word typed is guessed according to a statistical model that takes into account that the end of the sentence may not have been reached. Furthermore, the second-to-last word may be allowed to change based on the additional information gained from the last word. This enables the device to predict the second-to-last word with more precision. For Q14 and a dictionary of 463,000 words, tri-gram models result in error rates of only 0.4% if only the last word is guessed. If, in addition, the second-last word typed is allowed to change, the error rates drop to 0.2%. These figures exclude typing initials and uncommon abbreviations, but represent a simulation on over a million words taken from business news sources. The figures also exclude words not in the vocabulary. Such words account for 0.3% in the experiment. It also noteworthy that in only 0.7% of the time is neither the primary nor the secondary candidate for the keyed word correct. The corresponding figure for T9 is 0.4% (six times greater).

Simulations demonstrate that stochastic language models can be used in a realistic setting to significantly reduce the error rate for typing on a variety of cluster keyboards. The language models consist of probability estimates of occurrences of n-grams, sequences of n consecutive words, where n is 1 (uni-grams or word occurrences), 2 (bi-grams), or 3 (tri-grams). Calculated from large corpora, these probabilities are used to hypothesize the words typed. For n=1, the technique amounts to selecting the most frequent word typed. For n>1, the estimate of a word is dependent on the pattern of n-grams found in the whole sentence.

One challenge with using an n>1 approach is that the analysis can take place only after the whole sentence has been keyed. The telephone keypad study follows this traditional whole-sentence technique. See, Harald Rau and Steven S. Skiena, "Dialing for documents: an experiment in information theory," *Journal of Visual Languages and Computing*, 7(1): pages 79–95. In that paper, the authors set up a human-factors experiment based on the whole-sentence approach. The feedback given to the users as they type is the sequence of keys entered. Only when users terminate keying the sentence are the predicted words displayed. Typing discomfort tends to increase with sentence length. Although Rau and Skiena dismiss this problem, as a practical matter, the whole sentence analysis approach is flawed. The acceptance of cluster keyboards may be enhanced when the device almost always correctly guesses the intended word very soon after it has been keyed.

The present invention uses a novel statistical framework from that used by Rau and Skiena to better match human expectations. It is assumed that a beginning user will invariably verify the hypothesized word as soon as it has been keyed. To simplify the analysis, it is assumed that guessing individual characters is not relevant while the word is being typed. But as soon as a word boundary is entered (such as a space) the computer must produce the most likely word in the dictionary that matches the sequence of keys. To characterize the delay between the time the word boundary is identified and when the most likely word is committed, a delay parameter "d" is defined. When "d" is zero, the last hypothesis is committed immediately. As "d" increases, preliminary guesses are displayed for the last word, the second-last word, etc. up to the "d-th" last word. For the "d-th" last word itself, the current guess becomes committed and will not change.

The performance of this more realistic model ("d"=0) is likely inferior to that of the whole sentence analysis. But as results show, the approach disclosed herein provides a significant improvement over the uni-gram model.

To further investigate the usefulness of the "d" is zero model, it is stipulated that the cognitive load on the user will be diminished if the following holds: a correction of a wrongly guessed word can be accomplished through a single press on a single correction key such as the $2^{nd}$ key 122 in FIG. 1. The effect of the correction key is to replace the first hypothesis with the second. Thus, the present inventor also studied the model of a text entry system, where the user's action upon word entry is reduced to a single choice: do nothing to select the primary word choice or select the secondary choice. This technique will be of particular significance to the beginning user. Therefore, the invention involves calculating the top two candidates suggested by the language model for "d" is zero.

Also studied are the improved hypotheses that may be generated if the experienced user accepts a delay before a hypothesis by the computer is made final. Thus, when "d" is one, the hypothesis of the second-to-last word may be updated when the last word has been entered. For "d" equals two, the hypothesis of the third-to-last word also may be updated.

Finally, plots are provided that summarize the effects on accuracy of increasing the vocabulary size and of shrinking the models so that they demand less memory and computation. The simulations indicate that a linear relationship exists between the measured log perplexity (i.e., cross-entropy) and the various error rates studied.

Described next are cluster keys, statistical methods, and concepts pertaining to the notion of delay. The alphabet $\Sigma$ is $\{a, \ldots, z, \text{'''}, \text{'-'}, \text{spc}\}$. Text entry is considered for English. Space keys separate words or punctuation symbols entered on special keys. A single quotation mark "'" is considered (as in "it's") and a dash '-' (as in "e-mailed") as being clustered on a separate symbol key. A particular implementation of a cluster keyboard may instead map these characters to particular explicit key combinations. This would improve the results (to an insignificant degree). The '.' key could be mapped to the symbol key as well without affecting the results: no words in the vocabulary end with a "'" or '-'. Abbreviations are considered, but it is assumed that they are marked through the use of a period after each letter keyed. The results may be slightly better if abbreviations were not considered. For example, it is virtually impossible to guess most initials of person names. Fortunately, none of the keyboard layouts considered map "i" and "a" to the same key. Thus, the two standard English words that consist of one character require no disambiguation by the user.

The language models used in the present invention were built using 250 million words from the North American Business News (NAB) corpus, which was collected by DARPA for use in speech recognition research and benchmarking. It consists of Wall Street Journal articles and similar publications. For testing, the inventor used a held-out subset of approximately 1 million words from that corpus (the NAB LM development test set). To investigate task portability, the inventor also used approximately 17,000 words from the Switchboard corpus. This corpus consists of transcriptions of telephone conversations covering a variety of topics.

Given a vocabulary size v, the inventor identified the v most frequent words from the training corpus and build a lexicon L that maps each word w to a natural number t(w), which is called a word identifier. Given an n-gram order n, a stochastic back-off language model LM is built, using a compact finite automata representation. For any sequence $i_1, \ldots, i_n$ of word IDs, this model estimates the probability that the corresponding sequence of words occurs in the text as a sentence. Further, for a given non negative real number s, the language model can be shrunk to factor s using known methods to trade-off the size of the language model against its accuracy.

For each word w in a given sentence from the test set, let the I(w) be the set of word IDs corresponding to w and its homographs, i.e., to the set of words in the lexicon that would be mapped to the same key, sequenced as w. If w is in the dictionary, then its ID is guaranteed to be in the set, i.e., $t(w) \in I(w)$. If w is not in the lexicon, it is called out-of-vocabulary. That is considered an error. The set I(w) may or may not be empty. If I(w) is not empty, then the word guessing algorithm will be able to suggest a word, albeit wrongly. The out-of-vocabulary situation is represented by a special unknown token (which also has a word ID representation) that replaces the ID of the word.

The algorithm of the present invention hypothesizes words using the automata-theoretic representation as follows. Upon reading h keyed words of the sentence, the algorithm calculates for the last W words, the sets $I_{h-W+1}, \ldots, I_h$, where $I_k$ is the set of homographs in the lexicon that correspond to the ambiguous representation of the k-th word in the sentence. The term "W" refers to the window size. The whole history is not used for efficiency reasons. No precision is lost in practice due to this decision. If $I_k$ as just specified is empty, the singleton consisting of the unknown token replaces it.

The algorithm looks for the sequence of word IDs $i_{h-W+1}, \ldots, i_h$, that is most likely to be a prefix of some sentence. To find this sequence, the algorithm first makes all states in LM final so that it will accept any prefix of a sentence and not just complete sentences. Then the algorithm constructs an automaton S that recognizes all sequences $i_{h-W+1}, \ldots, i_h$ such that $i_k \in I_k$ for all $h-W<k \leq h$. Next, the algorithm computes the finite-state intersection of S and LM, which retains precisely those strings in common to S and LM. The resulting automaton is a compact representation of each word ID sequence compatible with the $I_k$S and weighted by the stochastic back-off model's estimate of the probability of that word sequence. Finally, the algorithm finds the most probable path in this automaton using a standard shortest path algorithm (with respect to negative log probabilities). The word ID of the last transition is then the most likely candidate for the last word typed. The AT&T Finite-State Machine (FSM) Library is used for all the finite-state representations and operations described above.

Described above is how the algorithm works for d=0. For d=1, a preliminary estimate is made for i for the k-th word $w_k$ when h reaches k according to the r=1 strategy. When h becomes k+1, the algorithm finds the most probable path as above. The word ID i' of the second-last transition is read off. If i' is not i, then the k-th word hypothesis is said to have changed. Clearly, it is important to measure how often this happens, since it is likely to distract the user. A particularly bothersome aspect of the d=1 method is if the first hypothesis i is correct, but the second i' is wrong. This situation is called a bad change. It is important to measure the ratio of bad changes to all changes. The case of d=2 is analogous to the case of d=1.

As mentioned above, the preferred embodiment of the invention is the Q14 keyboard layout. Other embodiments of the invention may encompass different numbers of keys to represent the alphabet or different keyboard layouts. For example, embodiments may include up to seven cluster keys and between eight and 26 cluster keys. For languages different from English where more than 26 letters are used, the principles of the present invention may be applied to design a reduced set of cluster keys to represent the alphabet in that foreign language.

Four keyboard layouts are discussed herein in more detail. The Q14, shown in FIG. 1, is obtained by pairing adjacent keys. The cluster keys are defined by the partioning as follows: {Q, W}, {E, R}, {T, Y}, {U, I}, {O, P}, {A, S}, {D, F}, {G, H}, {J, K}, {L}, {Z, X}, {C, V}, {B, N}, {M}. Thus this keyboard has fourteen letter or cluster keys.

An alternative keyboard layout is the Q10 keyboard with a cluster of ten alphabet keys. The Q10 layout is the result of merging the three rows of letter keys. Thus, it corresponds to the following portioning: {Q, A, Z}, {W, S, X}, {E, D, C}, {R, F, V}, {T, G, B}, {Y, H, N}, {U, J, M}, {I, K}, {O, L}, {P}.

A Q8 keyboard is obtained from Q10 by merging the four subsets that correspond to the middle of the keyboard. The layout thus is determined by the eight subsets {Q, A, Z}, {W, S, X}, {E, D, C}, {R, F, V, T, C, B}, {Y, H, N, U, J, M}, {I, K}, {O, L}, {P}. Goldstein et al. disclose a Q8 keyboard layout, but the analysis of the various layouts herein includes the Q8 layout for comparison. A Q5 keyboard layout is obtained from Q10 by overlaying the right half onto the left half. Thus the partioning is {Q, A, Z, Y, H, N}, {W, S, X, U, J, M}, {E, D, C, 1, K}, {R, F, V, 0, L}, {T, C, B, P}, which yields five keys. Another Q5 layout is based on Q14 by merging the three rows. Thus results the layout Q5-p {Q,W, A,S,Z,X,}, {E,R,D,F,C,V}, {T,Y,G,H,B,N}, {U,I,J,K,M}, {O,L,P}. Analyses of this keyboard (not shown) indicate that obtained error rates will be slightly higher with this layout than with Q5. The Q5-p is attractive since it is a more obvious clustering than Q5. Experiments show that Q5-p may still work well in communicative situations where some of the burden of interpretation can be shifted on the recipient. For example, a disabled person might be able to handle five letter switches (through hands, feet, or gaze) and a text where both the second and third top hypothesis for each word are shown will enable the reader to pick out the right word if shown among these. Experiments show that 0.7% of all words are not among the committed three top choices for Q5-p. And, when the device is allowed to take more time before predicting the intended word or words, in less than one word out of thirty cases is the top hypothesis not correct.

The telephone keyboard layout T9 is also analyzed. The "9" in T9 refers to the number of letter keys plus the spacebar key. Thus, T9 is most interestingly compared to the Q8 keyboard.

Two test sets were used in tests: the NAB, which consists of 54,265 sentences, and the Switchboard corpus, which consists of 2,475 sentences. An example from the NAB is: "in santa monica california well known hedge fund manager mark strome believes metals such as copper nickel and aluminum are poised for dramatic price rises." Thus, this corpus approximates formal writing. An example from the Switchboard set is: "i don't want to go through that i mean i'm i'm seeing someone now." Since this corpus stems from transcribed spoken language, the text structure is different from that of written language, even informal writing. Also, there are very many instances of hesitation and confirmation words that do not occur in writing, among them being "mhm', "-hum", "uh_huh", "uh-huh", "-hum", "mm", "oh", "uh", "um", "ah". To approximate informal writing, these words are removed from the training sets.

Four different vocabulary sizes are used in testing. The biggest one consists of 463 k words (different inflected forms of the same word count as different words). It consists of this complete set of words found in the NAB corpus. Vocabularies are used that consist of the most common 10 k, 40 k, and 160 k words from the complete set.

Altogether, eleven different combinations of vocabulary size, order, and shrink factor are considered. A first insight into the challenge of hypothesizing words can be derived from the table below, which summarizes for each layout the percentage of words that have homographs, the maximal number of homographs that a word has, and the average number of homographs.

TABLE 1

| Layout | # Words w. h.graphs (%) | Max. # h.graphs | H.graphs/ words (%) |
|---|---|---|---|
| Q14 | 14.84 | 13 | 0.27 |
| Q10 | 19.96 | 20 | 0.51 |
| Q8 | 32.61 | 82 | 1.84 |
| Q5 | 54.25 | 86 | 6.84 |
| T9 | 27.52 | 24 | 1.00 |

The numbers in Table 1 are taken with respect to the 463 k size vocabulary. The number of homographs is somewhat inflated by various minor anomalies in the corpus. The out-of-vocabulary issue and the perplexity measure provide further understanding of the fit of a language model with a test set. For two test sets, the measured out-of-vocabulary (OOV) rate is shown in Table 2:

TABLE 2

| text | 10 k | 40 k | 160 k | 463 k |
|---|---|---|---|---|
| NAB | 5.58 | 1.42 | .40 | .23 |
| Swbd | 6.34 | 1.14 | .65 | .60 |

The 160 k vocabulary covers both NAB and Switchboard test sets well. The OOV rate is about 0.5% for both. For the NAB test set, the full vocabulary results in a further drop in the OOV rate to less than one word out of every 400.

Figure 3:
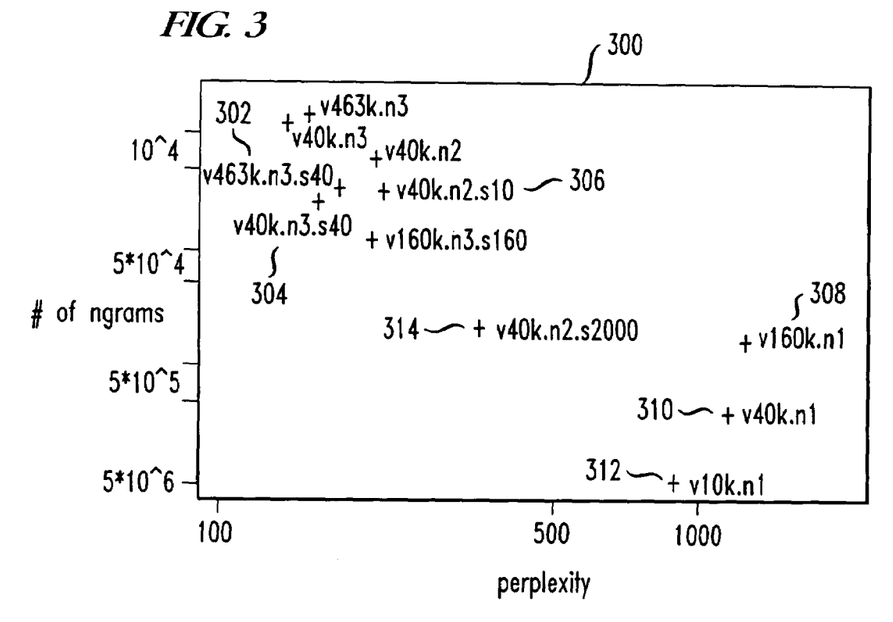
FIG. 3 illustrates the perplexity of language test sets versus the n-gram size.

The quality of the language models is measured in terms of their perplexity on the NAB test set. The perplexity of a language model over a test set t that contains N words is $2^{-H(t)}$ where H(t) is the cross entropy $(-\log_2 Pr_{LM}(t))/N$. Thus, the perplexity is the geometric mean number of branches per word, given the information in the language model. FIG. 3 illustrates a plot 300 of the number of n-grams in each model used as a function of its perplexity. A model is characterized by its vocabulary size, its n-gram order, and its shrink factor, if any. For example, the model v463k.n3.s40 502 has vocabulary size v 463 k, order n=3, and shrink factor s=40. The plot illustrates that model 302 has one of the lowest perplexities with less than 5 million n-grams. Comparing the tri-gram model v40.n3.s40 304 and the bi-gram model v40.n2.s10 306, note that they are of almost the same size, but the tri-gram model is better at predicting words in the NAB test set. Naturally, the uni-gram models 308, 310 and 312 suffer from high perplexity, but they are about two orders of magnitude smaller than the other models considered, with the exception of the bi-gram model 314 for vocabulary size 40 k with shrink factor of 2000.

Figure 4:
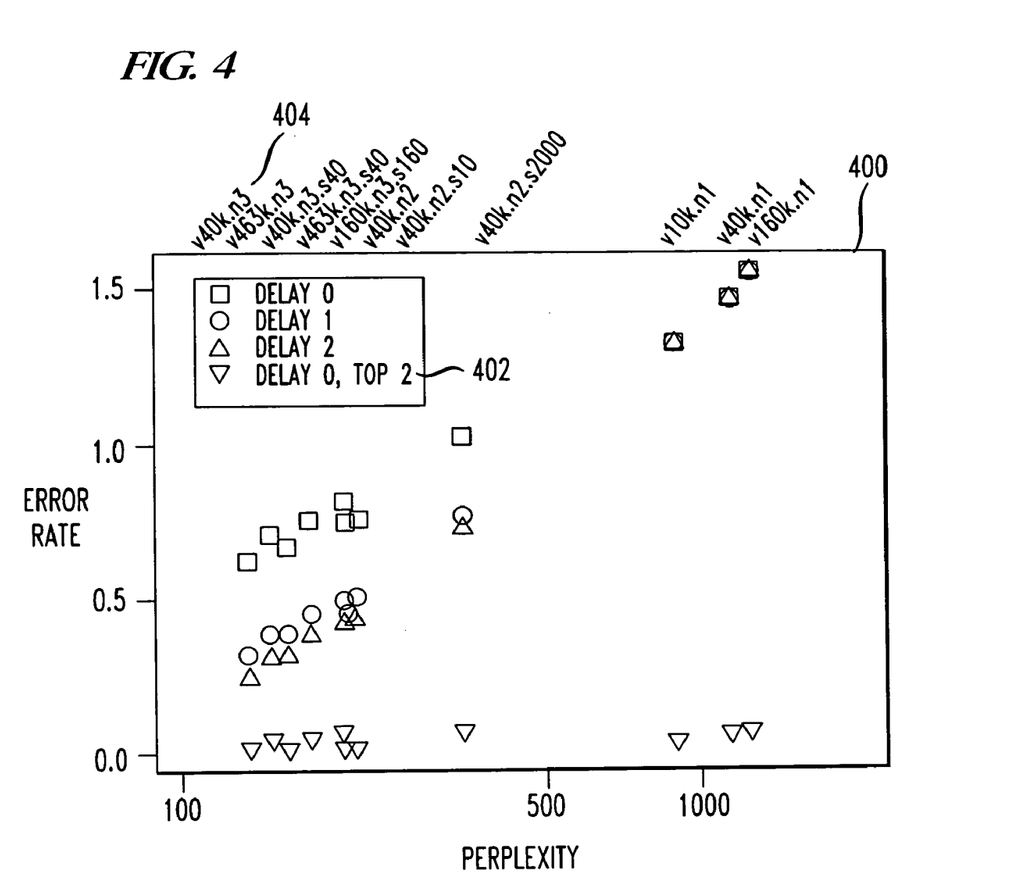
FIG. 4 illustrates a graph of the perplexity of language test sets versus error rate for the Q14 keyboard.

The error rates are plotted for each layout as a function of the perplexity of language models considered. FIG. 4 illustrates a plot 400 of the error rates for a Q14 cluster layout. Several important points are illustrated by plot 400. First, the top two hypotheses 402 according to all the language models, even the uni-gram ones, virtually always contain the correct word. The user may type for several thousand words on average before the intended word, if present in dictionary, is not among the two top candidates. Second, the error rate for the top candidate is about 1.5% for the uni-gram models, but only 0.7% for the best tri-gram models, assuming d=0 (when the user expects the correct word immediately after it has been typed). Also note that accepting a delay of d=1 for the tri gram models further cuts the error rates in half to about 0.4%. Third, further patience on the part of the user, namely for d=2, carries a relatively modest payoff. For the best model, v40.n3 404, the error rate drops to only 0.3%. Fourth, note the approximate linear relationship between log perplexity and error rates, for all four kinds of errors.

Figure 5:
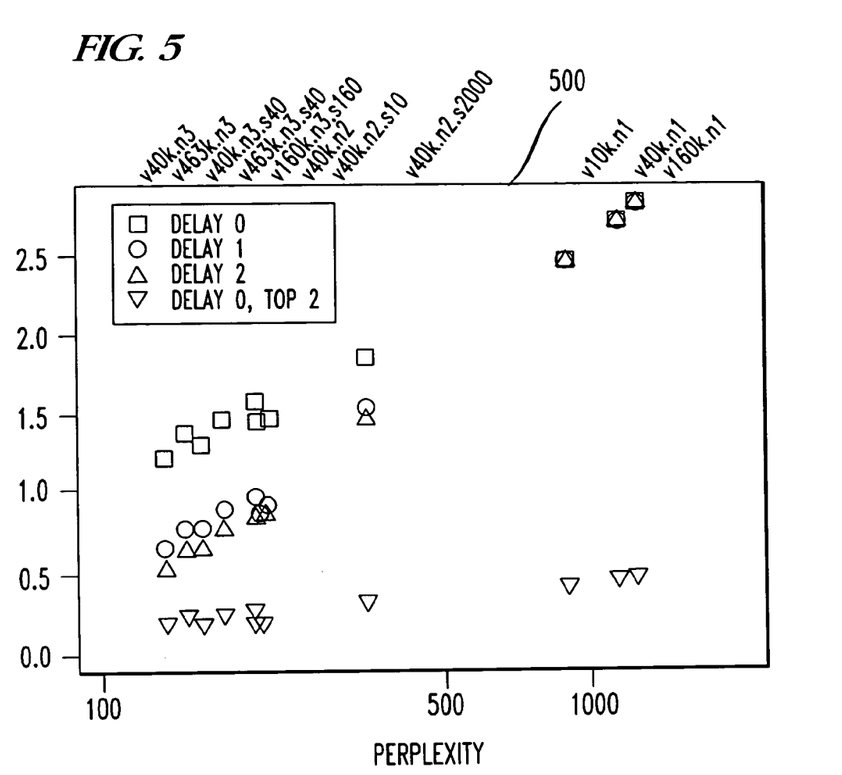
FIG. 5 illustrates a graph of the perplexity of language test sets versus error rates for the Q10 keyboard.

FIG. 5 illustrates a plot 500 of the perplexity versus error rate for the cluster keyboard Q10. The 10-key QWERTY layout is similar in performance to Q14 according to FIG. 5. Most error rates are about 50–80% higher, except for the rate of words not among the top two candidates, which is around 0.25% for the better models. This is about an order of magnitude worse than Q14.

Figure 6:
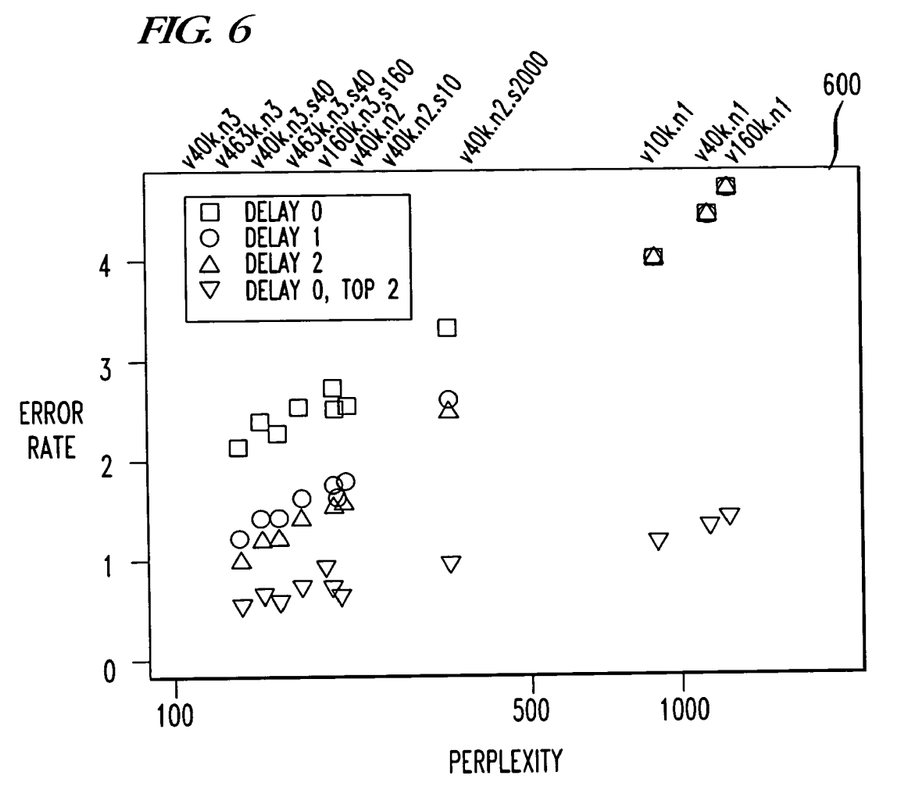
FIG. 6 illustrates a graph of the perplexity of language test sets versus error rates for the Q8 keyboard.

FIG. 6 illustrates a plot 600 of the Q8 keyboard layout. The layout of the Q8 non-keyboard QWERTY increases error rates by another 50% or so according to FIG. 6. It is worth noticing that for the best language models, the error rate of the top candidate, assuming delay d=0, is about 2% for our best model, whereas the uni-gram models yield error rates of about 4%. These numbers can be contrasted to the 3.5% figure referenced above with respect to the Goldstein et al. Q10 keyboard layout.

Figure 7:
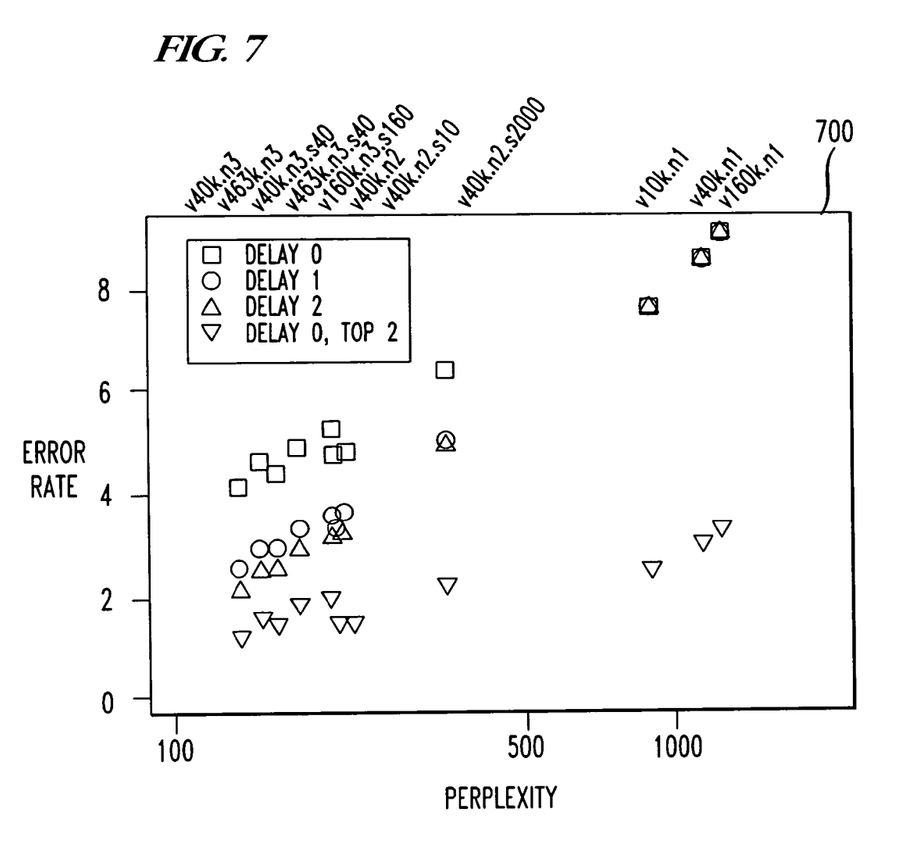
FIG. 7 illustrates a graph of the perplexity of language test sets versus error rates for the Q5 keyboard.

FIG. 7 illustrates a plot 700 of the cluster Q5 keyboard. The data for Q5 shows that with a good language model the correct word will be among the top two candidates for approximately 98.5% of all entries. This raises the interesting possibility that typing with just five keys might be almost as effective as on twenty-six keys. Only for one word out of seventy will a correction needing more than one key press be necessary. Since it reduces the error rate by ¾, the use of tri-gram models for this keyboard seems called for.

Figure 8:
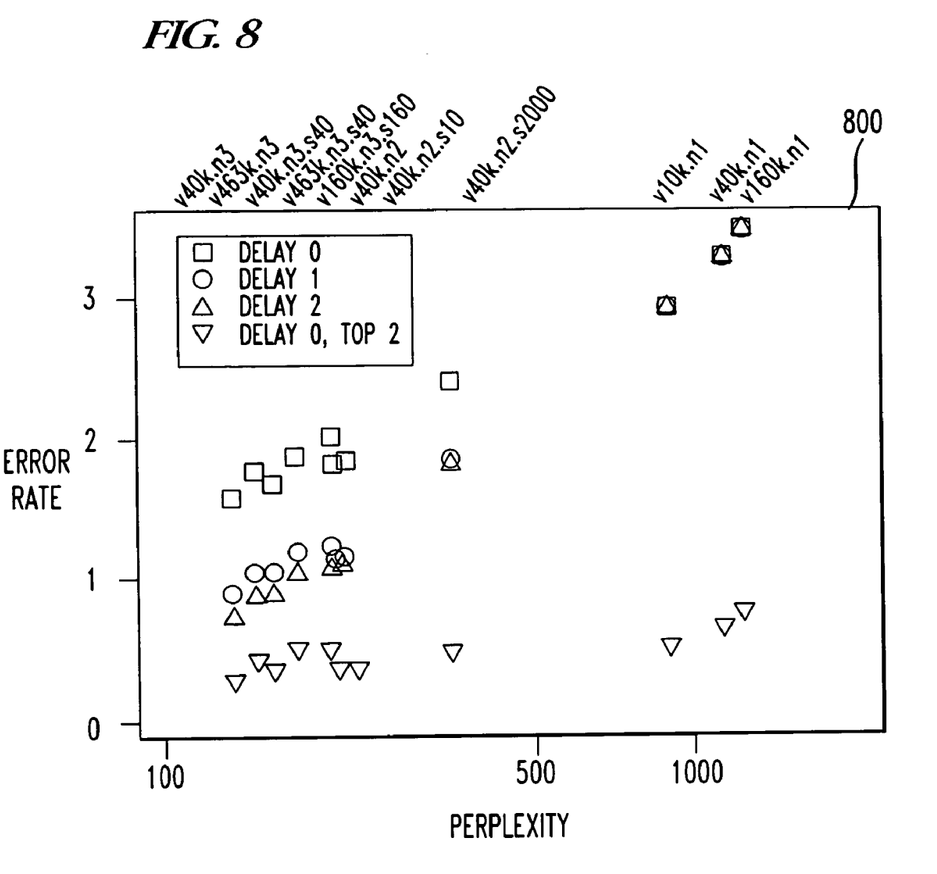
FIG. 8 illustrates a graph of the perplexity of language test sets versus error rates for the T9 keyboard.

FIG. 8 illustrates a plot 800 of the perplexity versus error rate for various models with the T9 keyboard. For T9, it is possible to reach an error rate below 10% if the second best word is allowed to change. If not, the use of tri-grams still cuts the error rate in half over the conventional technique of uni-grams.

One aspect of the testing of the present models involved determining how well the language models do on tasks that are different from 'business news.' For this purpose, the Switchboard test set was used but modified as described above. Unfortunately, initials and abbreviations are normalized differently in the two test sets. Also, initials and abbreviations are prone to misrecognitions. For example, it is virtually impossible to guess initials correctly if entered via non-singleton cluster keys. Thus, the scores are corrected so that the system disregards all initials and abbreviations. This is a reasonable assumption from a human factors point of view: abbreviations will be so difficult to enter via the non-disambiguated cluster keys that the recommended method always is to use slower explicit entry.

Further corrections are performed since the language models do not reflect the ways numbers are entered. The problem is that the frequency of "eight" is grossly overestimated on the NAB corpus, since all numbers are spelled out as in "two hundred ninety eight". This has led to spurious misrecognitions of the word "right" which in some cluster layouts is homographic to "eight". The scores are adjusted to address this particular issue.

The quality of v463k.n3 on the NAB and Switchboard test with d=1 is shown in Table 3:

TABLE 3

| Error rate | Q14 | Q10 | Q8 | Q5 | T9 |
|---|---|---|---|---|---|
| NAB (%) | .2 | .6 | 1.0 | 2.3 | .7 |
| Swbd | .4 | 1.5 | 2.7 | 4.7 | 1.0 |

The error rates increase significantly when going from the NAB test set to the Switchboard set. Still, Q14 works well on the Switchboard test set since the error rate remains negligible. But the doubling of the error rate to 4.7% for Q5 clearly makes it less usable. With T9, the error rate rises from 0.7% to 1.0%.

On NAB, the elimination of initials and abbreviations has a small, but measurable effect on the accuracy of the better keyboards. For example, the error rate for Q14 reported in FIG. 4 is 0.38% and it drops to 0.24% when not considering initials and abbreviations. An inspection of the actual errors reveals that initials by far constitute the main problem. The inventor's claim that Q14 can be used with an accuracy of up to 99.5% is based on this latter figure added to the OOV rate of 0.23%.

From inspection of the test results, more cases are found where artifacts of the normalizations lead to common words being mis-recognized. Thus, by further engineering language models, even more robust ones may be calculated.

For v463k.n3, the ratio of changes and bad changes have been calculated and shown in Table 4. The Table 4 below explains how often changes occur and what percentage of changes are bad. Thus for d=1 and in the case of Q14, the user will be bothered by a bad change rate of 0.09%, one for each 1100 words entered.

TABLE 4

|  |  | Q14 | Q10 | Q8 | Q5 | T9 |
|---|---|---|---|---|---|---|
| Changes (%) | d = 1 | 0.50 | 0.99 | 1.68 | 3.13 | 1.25 |
|  | d = 2 | 0.10 | 0.22 | 0.24 | 0.66 | 0.27 |
| Bad Changes (%) | d = 1 | 17.95 | 19.02 | 16.41 | 15.61 | 18.54 |
|  | d = 2 | 27.96 | 23.39 | 22.48 | 24.08 | 21.39 |

The present invention illustrates that n-gram models, for n=3, have an important role to play for the entry of English text on cluster keyboards. The results discussed herein indicate that Q14 is significantly more robust than T9 and better than other QWERTY arrangements. Also, Q14 allows a familiar layout and an easily understood disambiguation method, which uses two modifier keys for choosing the left and right letter on cluster keys. Also, as a substitute for spoken communication, the Q5 keyboard may enable disabled persons to communicate effectively using far fewer keys than twenty-six. Compared to earlier work, these results may be turned into a distinct human factors advantage: assuming a fixed layout of keys that requires no interaction. Previous uses of cluster keyboards assume a dynamic layout that changes with each key press.

Although the above description may contain specific details, they should not be construed as limiting the claims in any way. Other configurations of the described embodiments of the invention are part of the scope of this invention. For example, various embodiments may utilize less than eight keys or between eight and twenty-six cluster keys wherein the alphabet is organized in a QWERTY layout or a layout that places the alphabet letters in a substantially similar layout to the standard keyboard layout. Some modifications and expansion of these limits may also be included within the scope of the invention when such extensions are needed. For example, if more than twenty-five cluster keys are needed for a different language to effectively work according to the other principles of the invention, then such a number of cluster keys may fall within the scope contemplated. The organization, number and location of ancillary supporting keys to the alphabet keys is variable and is certainly not limited to the embodiments shown. Accordingly, the appended claims and their legal equivalents should only define the invention, rather than any specific examples given.

We claim:

1. A method of enabling a user to interact with an electronic device, the method comprising:

receiving a signal associated with the user depressing one of a plurality of less than twenty-six cluster keys, at least one cluster key representing more than one letter of the alphabet, the plurality of less than twenty-six cluster keys arranged such that all of the letters in the alphabet are substantially in a standard keyboard layout; and if the user depresses at least one disambiguation key in connection with depressing one of the plurality of less than twenty-six cluster keys, receiving a signal identifying a letter of the alphabet associated with the depressed alphabet key, wherein upon receiving a word boundary indication, the method further comprises identifying a most likely word and a second most likely word using a language model that can change the most recently typed word.

2. The method of claim 1, wherein the electronic device comprises between eight and twenty-four cluster keys.

3. The method of claim 2, wherein the electronic device comprises fourteen cluster keys.

4. The method of claim 2, wherein upon receiving the word boundary indication, the language model changes the two most recently typed words.

5. The method of claim 2, wherein upon receiving the word boundary indication, the language model can change changes the three most recently typed words.

6. A method of enabling a user to interact with an electronic device, the method comprising:

receiving a signal associated with the user depressing one of approximately sixteen cluster keys on an electronic device, a predetermined number of cluster keys representing more than one letter of the alphabet such that all the alphabet letters are represented, the approximately sixteen cluster keys arranged such that all the letters in the alphabet are in a QWERTY position;

displaying a character comprising each letter of the alphabet associated with the depressed cluster key, a most likely letter intended by the user more prominently displaying in comparison to a non-most likely intended letter associated with the depressed cluster key; and if the user presses a correction key, altering the displayed character to more prominently display the non-most likely intended letter associated with the depressed cluster key.

* * * * *